United States Patent

Sansone

[11] Patent Number: 5,970,150
[45] Date of Patent: *Oct. 19, 1999

[54] SYSTEM FOR PRODUCING VERIFIABLE KIOSK RECEIPTS AND RECORDS

[75] Inventor: Ronald P. Sansone, Weston, Conn.

[73] Assignee: Pitney Bowes Inc., Stamford, Conn.

[*] Notice: This patent is subject to a terminal disclaimer.

[21] Appl. No.: 08/770,189

[22] Filed: Dec. 19, 1996

[51] Int. Cl.[6] ............................. H04K 1/00; G09C 3/08; G09C 3/00; H04L 9/00; H04L 15/34
[52] U.S. Cl. ............................. 380/51; 380/55; 380/23; 380/25; 705/39; 705/41; 705/44; 705/400; 705/401
[58] Field of Search ............................. 380/51, 55, 23, 380/25; 705/39, 41, 44, 400, 401

[56] References Cited

U.S. PATENT DOCUMENTS

| | | | |
|---|---|---|---|
| 4,097,923 | 6/1978 | Eckert et al. | 364/900 |
| 4,743,747 | 5/1988 | Fougere et al. | 235/494 |
| 4,760,532 | 7/1988 | Sansone et al. | 364/464 |
| 4,780,835 | 10/1988 | Sievel et al. | 364/550 |
| 5,257,196 | 10/1993 | Sansone | 364/464.02 |
| 5,272,640 | 12/1993 | Wu | 364/464.02 |
| 5,309,363 | 5/1994 | Graves et al. | 364/464.02 |
| 5,369,258 | 11/1994 | Sansone et al. | 235/381 |
| 5,423,054 | 6/1995 | Schmidt et al. | 395/800 |
| 5,457,636 | 10/1995 | Sansone et al. | 364/478 |
| 5,471,925 | 12/1995 | Heinrich et al. | 101/91 |
| 5,586,036 | 12/1996 | Pintsov | 364/464.02 |
| 5,606,507 | 2/1997 | Kara | 364/464.18 |
| 5,680,463 | 10/1997 | Windel et al. | 380/51 |

*Primary Examiner*—Gail O. Hayes
*Assistant Examiner*—Hrayr A. Sayadian
*Attorney, Agent, or Firm*—Ronald Reichman; Melvin J. Scolnick

[57] ABSTRACT

A postage meter that is contained in a kiosk may be used to produce verifiable receipts for commercial transactions. The imbedded digital metering cryptographic technology that is contained in a postage meter may be used to produce a verifiable receipt. Several of the collected "commercial" transaction data elements are presented to the existing meter encryption module for processing as the meter was processing an envelope. The output encrypted data string is used as a new field in the receipt. Assuring that the receipt is authentic. Verification can be performed as follows: using the printed receipt as a source of data (at some later time) periodically on the archived records stored in the kiosk during the day on the uploaded "order" files before actual processing.

12 Claims, 8 Drawing Sheets

```
                    Kiosk Receipt
        ----------------------------------------
16 — K.ID-      xxxxxxxx
14 — Location xxxxxxx xxxxxxx xxxxxxxxx
21 — Date xx xx xx              Time xx xx xx    — 22
        ----------------------------------------
8  — Ship to: xxxxxx xxxxxxx      xxxxx
              xxxxx    xxxxxxx    xxxxx           — 20
              xxxxx              zzzzzzzz
        ----------------------------------------
23 — Cash      xxxxxx xxxxxxx     xxxxx
     Charge   xxxxx   xxxxxxx     xxxxx
              xxxxx              zzzzzz
        ----------------------------------------
24 — Card Type xxxx
     Account # xxxxxxxxxxxxxxxxxx                 — 25
     Auth code xxxxx                              — 26
     Name      xxxxxxxx xxxxxxxxxxxxxxxxxxx       — 27
        ----------------------------------------
                    30       31        32
28 — ORDER
     code    description    qty      price zzzzz  1) xxxxxxxx     xxx      $ xxx.xx
29 — zzzzz  2) xxxxxxxxx    xxx      $ xxx.xx
               tax                   $    t.tt    — 33

TOTAL.............   $ xxx.xx      — 34

35 — KT xxxxxxxxxxxxxxxxxx
```

FIG. 7 ent of cash 23 paid for the

SYSTEM FOR PRODUCING VERIFIABLE KIOSK RECEIPTS AND RECORDS

FIELD OF THE INVENTION

The invention relates generally to kiosks, and more particularly to kiosks that produce verifiable receipts and records.

BACKGROUND OF THE INVENTION

A kiosk is a small structure or pavilion. It is often open on one or more sides and it is often used as a newsstand or booth. There are five different types of kiosks i.e., informational; promotional; experiential; transactional; and vending. Informational kiosks are used in cities, companies and buildings. They tend to be small because the offered information is specific.

Promotional kiosks are essentially electronic advertising displays to present the goods and services of one or more companies. Experiential kiosks are used to simulate a desired user situation. For instance, simulating a museum tour or a tour of a historical site. An experiential kiosk would show visitors the museum displays and events and also map a plan of time and route for viewing the displays and events. Transactional kiosks allow the users, via a credit card or other payment method, to make purchases which are fulfilled elsewhere and shipped to a designated location. Vending kiosks are employed to process and then deliver the "product" or fund. Typically, cash or electronic transactions are used for payment.

Postal kiosks are a type of vending kiosk, whereby one is able to frank and then post mail in a convenient fashion. Such kiosks are designed to receive the mail, weigh the mail, inform the user as to the amount of postage due and upon user acceptance and payment dispense the postage. Most kiosks have convenience items such as currency and coin acceptors and coin changes. Recently, credit card slots and credit card charging mechanisms have been added to kiosks.

Heretofore, kiosks only dispensed goods or services that were supplied by one entity, i.e. the owner of the kiosk. The goods or services dispensed by the kiosks were dispensed by people or machines. The machine controlled kiosk produced receipts that were printed by printers that could be easily copied or varied. Hence, the prior art did not produce verifiable receipts.

SUMMARY OF THE INVENTION

This invention overcomes the disadvantages of the prior art by providing a kiosk that produces verifiable receipts for commercial transactions. The verifiable receipts may be used to enable a customer and multiple entities whose goods and/or services are sold by the kiosk feel secure that the receipts are genuine. The verifiable receipts may also be used by a postal kiosk to evidence that: the correct postage was placed on a letter or package; that expedited mail (Express or Priority Mail) was deposited; registered or certified mail was deposited; international mail was deposited; the address on the letter is the same address that is on the certificate of mailing; and that a specified amount of funds was received for a postal money order The imbedded digital metering cryptographic technology that is contained in a postage meter may be used to produce a verifiable receipt. Several of the collected "commercial" transaction data elements are presented to the existing meter encryption module for processing as the meter was processing an envelope. The output encrypted data string is used as a new field in the receipt. Assuring that the receipt is authentic. Verification can be performed as follows: using the printed receipt as a source of data (at some later time) periodically on the archived records stored in the kiosk during the day on the uploaded "order" files before actual processing.

Also, contested or missing orders could be validated as part of the vendor "customer service" resolution process.

DETAILED DESCRIPTION OF THE PREFERRED EMBODIMENT

Figure 1:
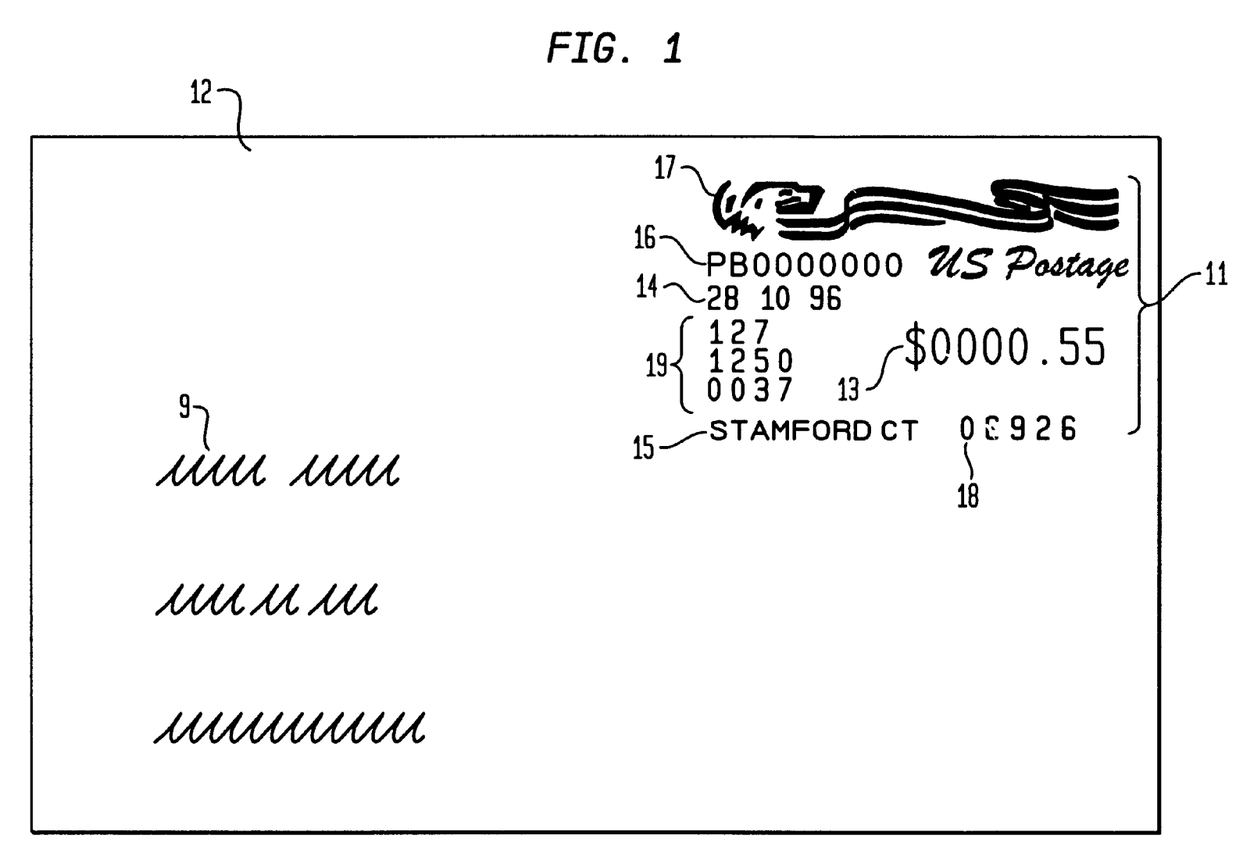
FIG. 1 is a drawing of a kiosk postal meter indicia.

Referring now to the drawings in detail, and more particularly to FIG. 1, the reference character 11 represents a kiosk postal meter indicia that was printed on mail piece 12 by a printer. Mail piece 12 contains an address 9. The postal indicia 11 contains: a dollar amount 13; the date 14 that the postal indicia was affixed to mail piece 12; the place the mail piece was mailed from 15; the postal meter serial number 16; a meter graphic 17; a zip code 18; and a encrypted code 19. Encrypted code 19 contains encrypted information pertaining to mail piece 12, i.e., information pertaining to the amount of postage, date, destination to which the mail piece is addressed, zip code, etc.

Figure 2:
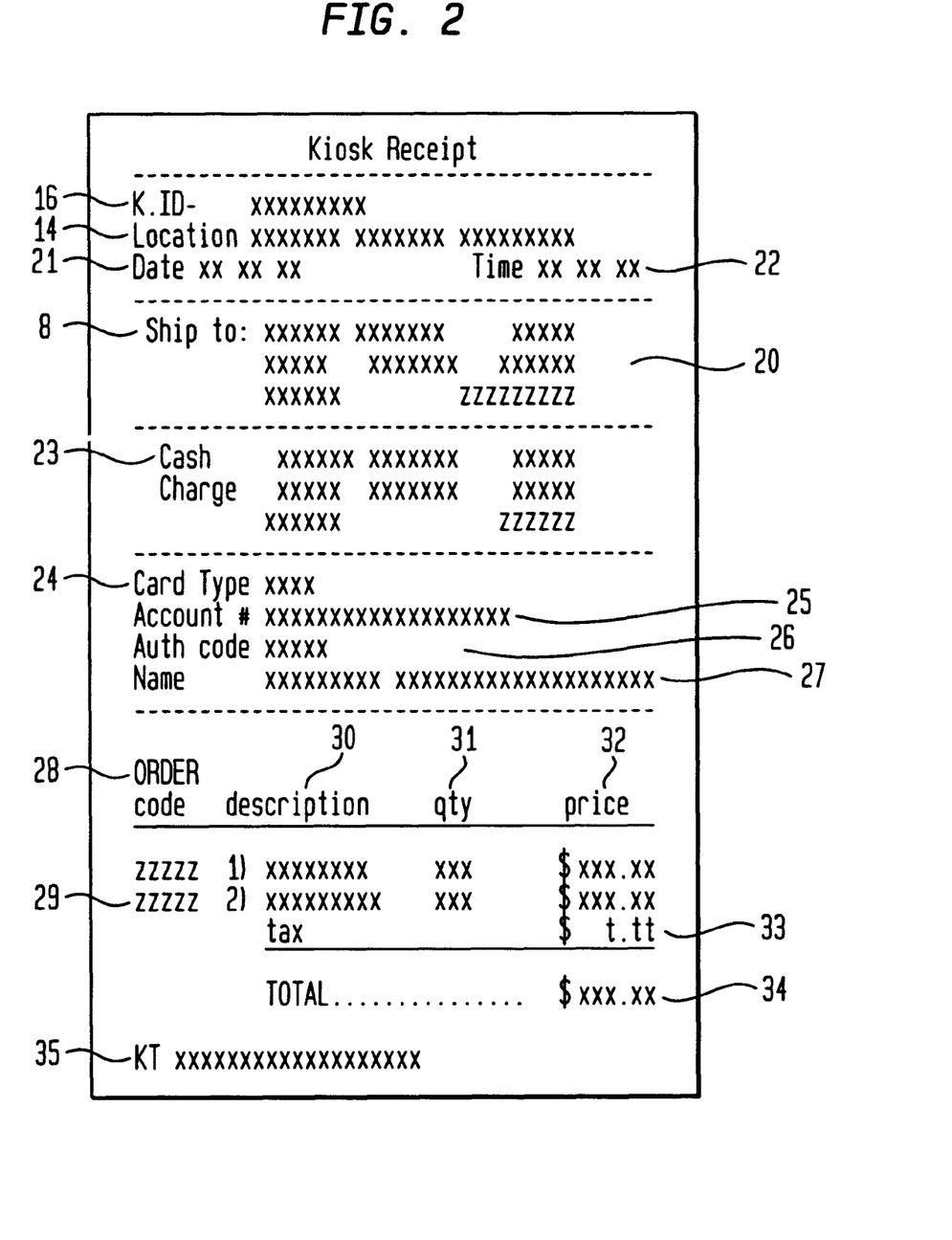
FIG. 2 is a drawing of a kiosk receipt.

FIG. 2 is a drawing of kiosk receipt 20. Receipt 20 contains: postal meter serial number 16; the location 14 of the postage meter; the date 21; the time 22; receipt 20 was made; the party and address 8 to whom the ordered goods are going to be shipped; the amount of cash 23 paid for the order; the type of credit card 24 used to order the goods, the account number 25 of the credit card; the credit card authorization code 26 of the credit card; the name 27 on the credit card; and the order 28. Order 28 will include: a code 29 for each of the goods ordered; a description 30 for each of the goods ordered; the quantity 31 of the goods ordered; the price 32 for each of the goods ordered; the tax, if any applicable to the goods ordered 33; and the total cost 34 for the order. Receipt 20 will also include a kiosk transaction reference number 35. Reference number 35 is a cryptographic code that contains encrypted information pertaining to receipt 20.

Figure 3:
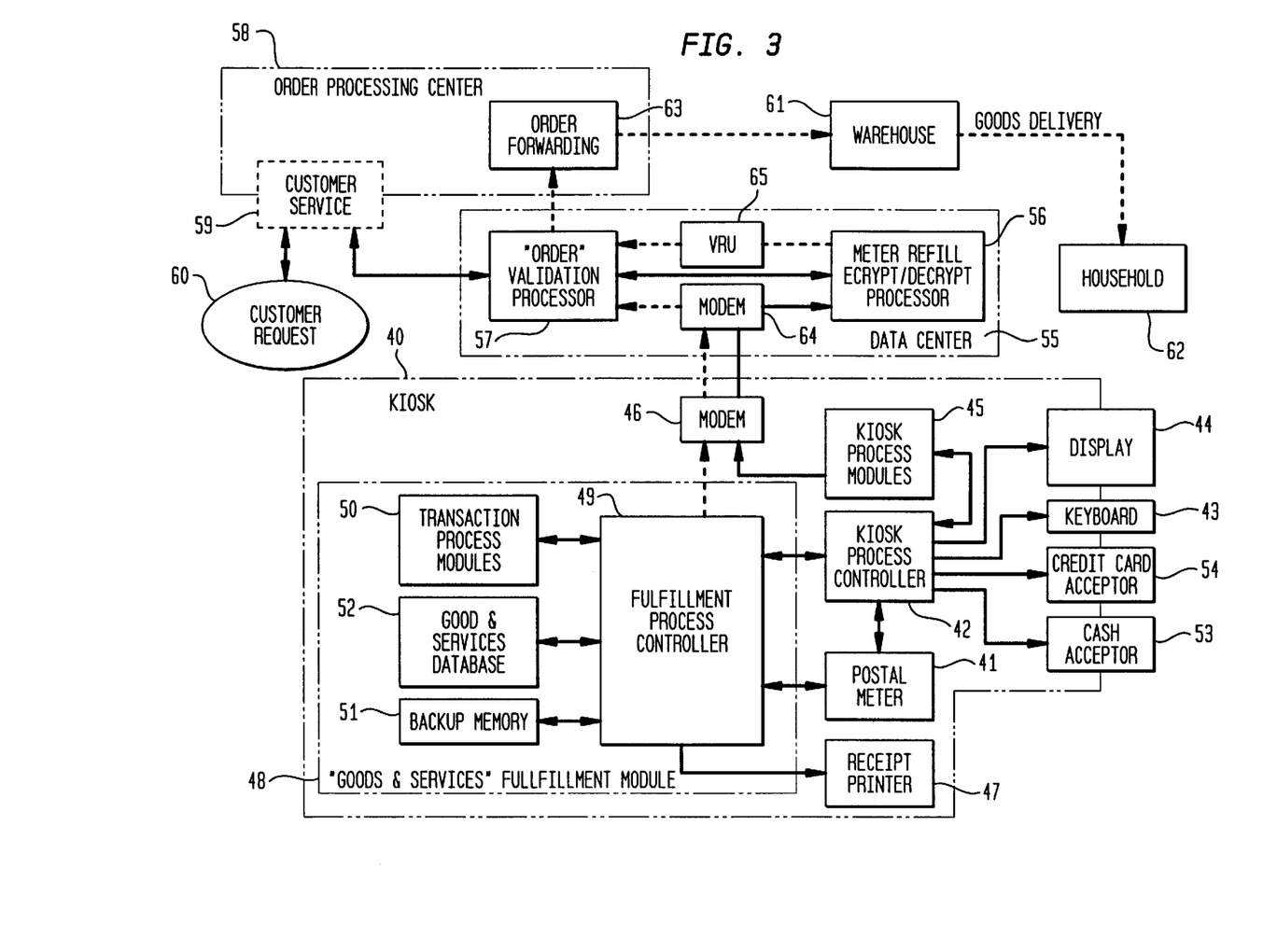
FIG. 3 is a block diagram of a system for producing and using verifiable kiosk receipts and records.

FIG. 3 is a block diagram of a system for producing verifiable kiosk receipts and records. Kiosk 40 contains: a postal meter 41; a kiosk process controller 42 that is coupled to meter 41 ;a keyboard 43 that is coupled to controller 42, a display 44 that is coupled to controller 42; kiosk process modules 45 that are coupled to controller 42; a cash acceptor 53 that is coupled to controller 42, a credit card acceptor 54 that is coupled to controller 42; a modem 46 that is coupled to process modules 45; a postal receipt printer 47; and goods and services fulfillment module 48. Goods and services fulfillment module 48 contains: a fulfillment process controller 49 that is coupled to modem 46; controller 42; postal meter 41; receipt printer 47; transaction process modules 50; backup memory 51; and goods and services data base 52. It would be obvious to one skilled in the art that other forms for the payment of goods and services may be used, i.e., debit cards, etc.

Postage meter 41 includes an ascending register and a descending register. As is known in the art the ascending register maintains a record of all the postage dispensed by the postage meter 41 and the descending register maintains a record of the amount of postage that has been purchased by the customers of kiosk 40. Meter 41 may be used to produce postal receipts upon customer request and goods and services receipts. Each postal transaction performed by meter 41 is communicated to controller 49. Each order transaction is transmitted from controller 49 to meter 41. Controller 49 controls the transaction process for transaction process modules 50, goods and data services database 52 and receipt printer 47. Controller 49 will be more fully described in the description of FIGS. 4–6.

Kiosk process modules 45 include: a voice module, a audio module, video modules, currency modules and postal calculation modules. Modules 45 is described in Sansone's U.S. Pat. No. 5,369,258 entitled "Postage Applying Kiosk" herein incorporated by reference.

Kiosk process controller 42 controls kiosk process modules 45. Controller 42 controls the weighing of the mail piece, the determining of the correct postage, and causes meter 41 to affix the correct postage to the mail piece (not shown). Process controller 42 is described in Wu's U.S. Pat. No. 5,272,640 entitled "Automatic Mail-Processing Device With Full Functions" herein incorporated by reference.

The user of kiosk 40 places the material to be mailed on a scale (not shown) and enters the classification of the material to be mailed, i.e., first class mail, second class mail, parcel post, etc. into keyboard 43. Relevant information regarding the object to be mailed is displayed on display 44.

Kiosk 40 contains a currency receiving slot 53 for receiving coins and bills, a currency handler for receiving payment and dispensing change and a currency return slot for returning over payments. Kiosk 40 will also have speakers that will communicate prompts to the user and a door for the purpose of allowing the postman to remove mail from kiosk 40 after meter 41 has affixed the correct postage thereto. Kiosk 40 contains a card reader 53 for reading credit cards. The aforementioned items are not shown as they do not form a part of the invention except to the extend of being a part of the kiosk.

Modem 46 communicates with modem 64 located at data center 55 via a telecommunications path. Data center 55 contains an encryptor/decryptor processor 56 and a order validation process controller 57. Encryptor/decryptor processor 56 is described in Eckert's U.S. Pat. No. 4,097,923 entitled "Remote Postage Meter Charging System Using An Advanced Microcomputerized Postage Meter", herein incorporated by reference. Encryptor/decryptor processor 56 decrypts the coded message that was formulated by meter 41 and subsequently transmitted to data center 55 via modem 46 and modem 64. Order validation process controller 57 validates the plain text that was affixed to receipt 20 (FIG. 2) and the information transmitted from processor controller 49. Encryptor/decryptor processor 56 is connected to order validation processor 57. Order validation processor 57 is linked to processor 56 through VRU 65.

Figure 7:
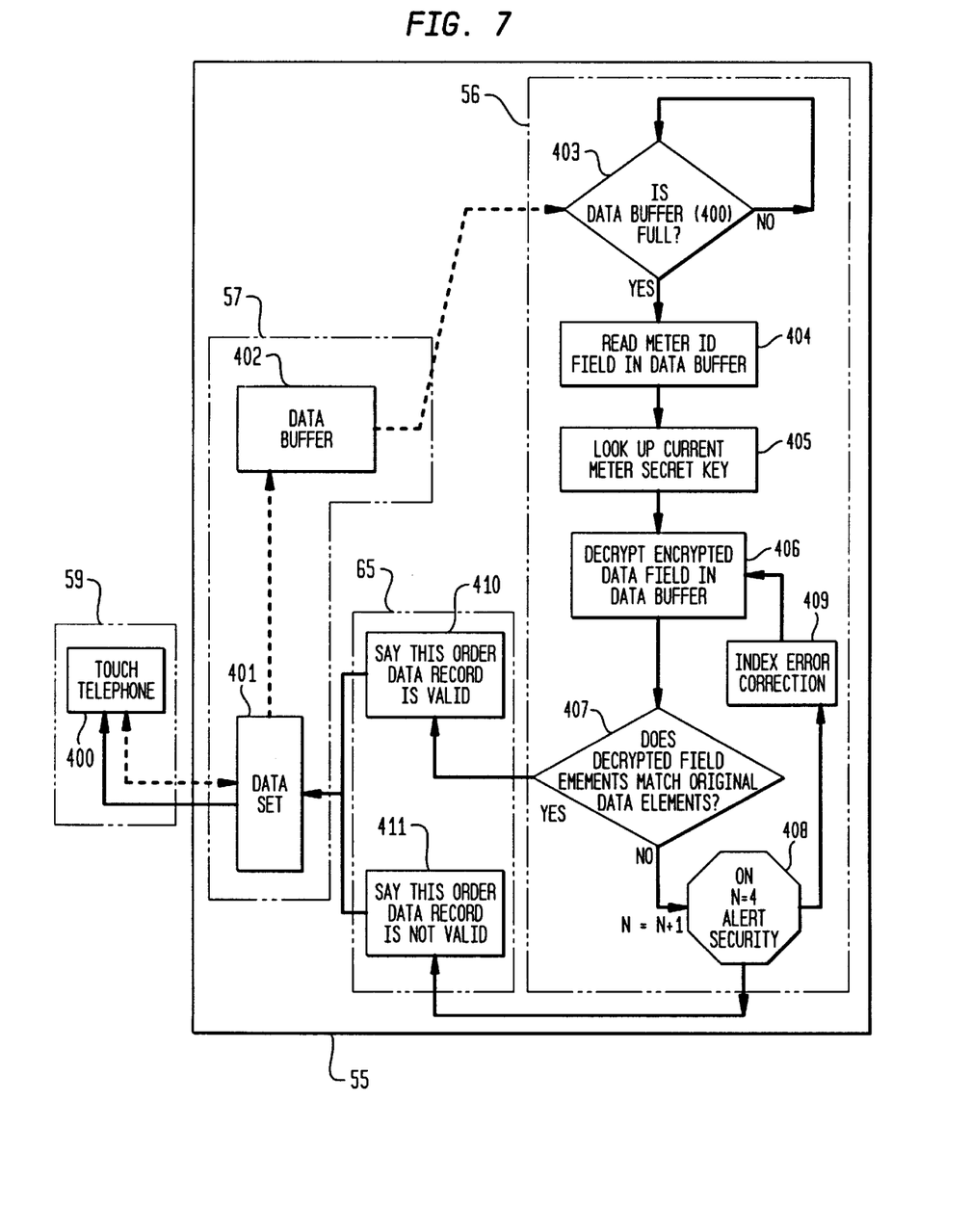
FIG. 7 is a flow chart showing how customer service applications is supported by VRU 65 over telephone 400.

Data center 55 is coupled to order processing center 58. Center 58 has a customer service section 59 that receives requests from customers 60 and an order forwarding section 63. Section 63 processes the orders it receives from order validation processor 57 and forwards the orders to warehouse 61. Warehouse 61 packs the ordered goods and ships them to household 62. A customer having a receipt 20 may challenge and/or seek information about the goods and/or services that are indicated by receipt 20. Receipt 20 may be utilized if cash or other forms of payment were made. Personnel at processing center 58 can determine whether or not receipt 20 is a valid receipt. This may be accomplished by having the customer read coded message 35 to the personnel at processing center 58. Coded message 35 is transmitted to processor 57 via touch tone telephone 400 (FIG. 7).

Figure 4A:
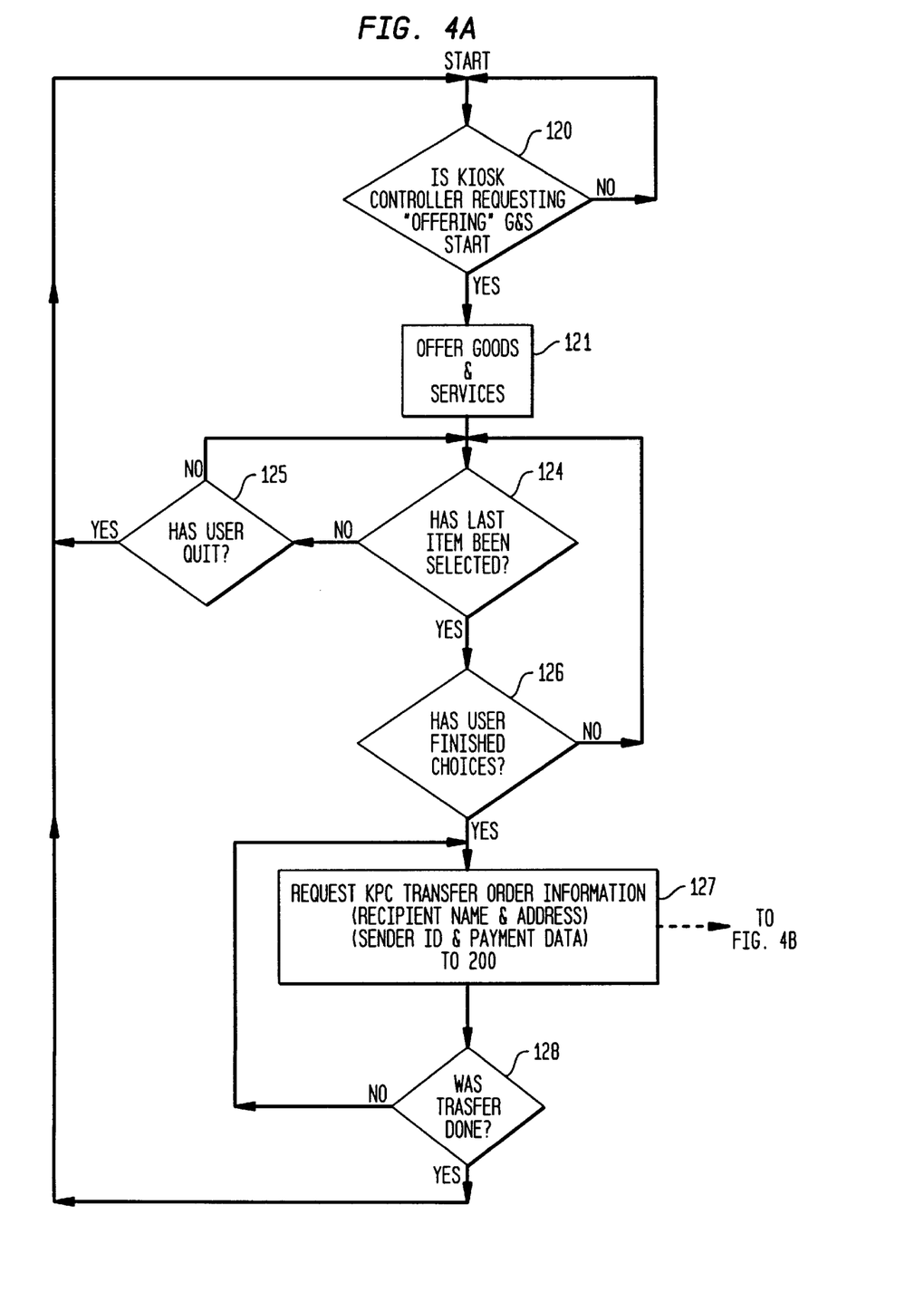
FIGS. 4–6 is a flow chart showing the program contained in fulfillment process controller 49 of FIG. 3.
Figure 4B:
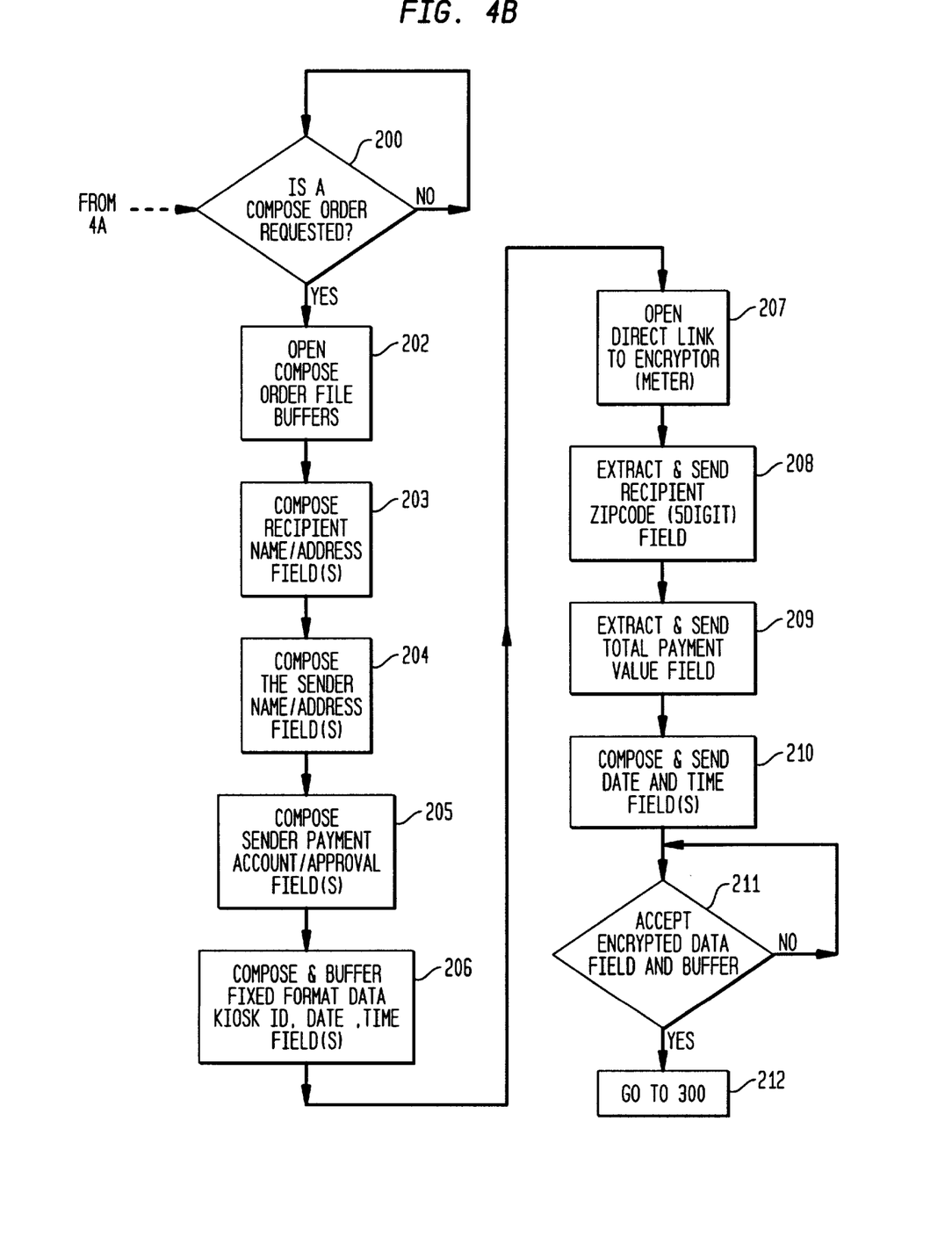
Figure 5:
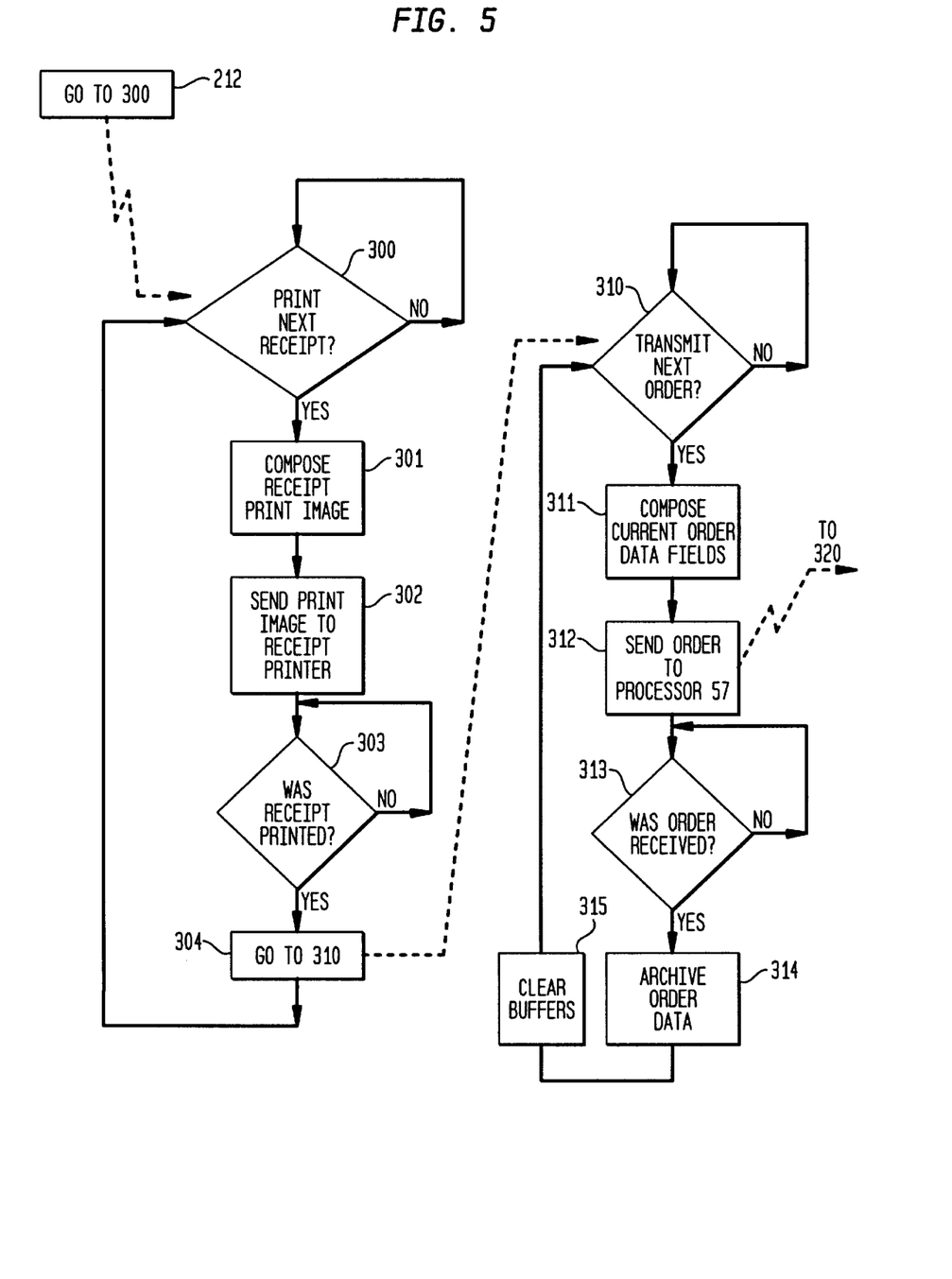
Figure 6:
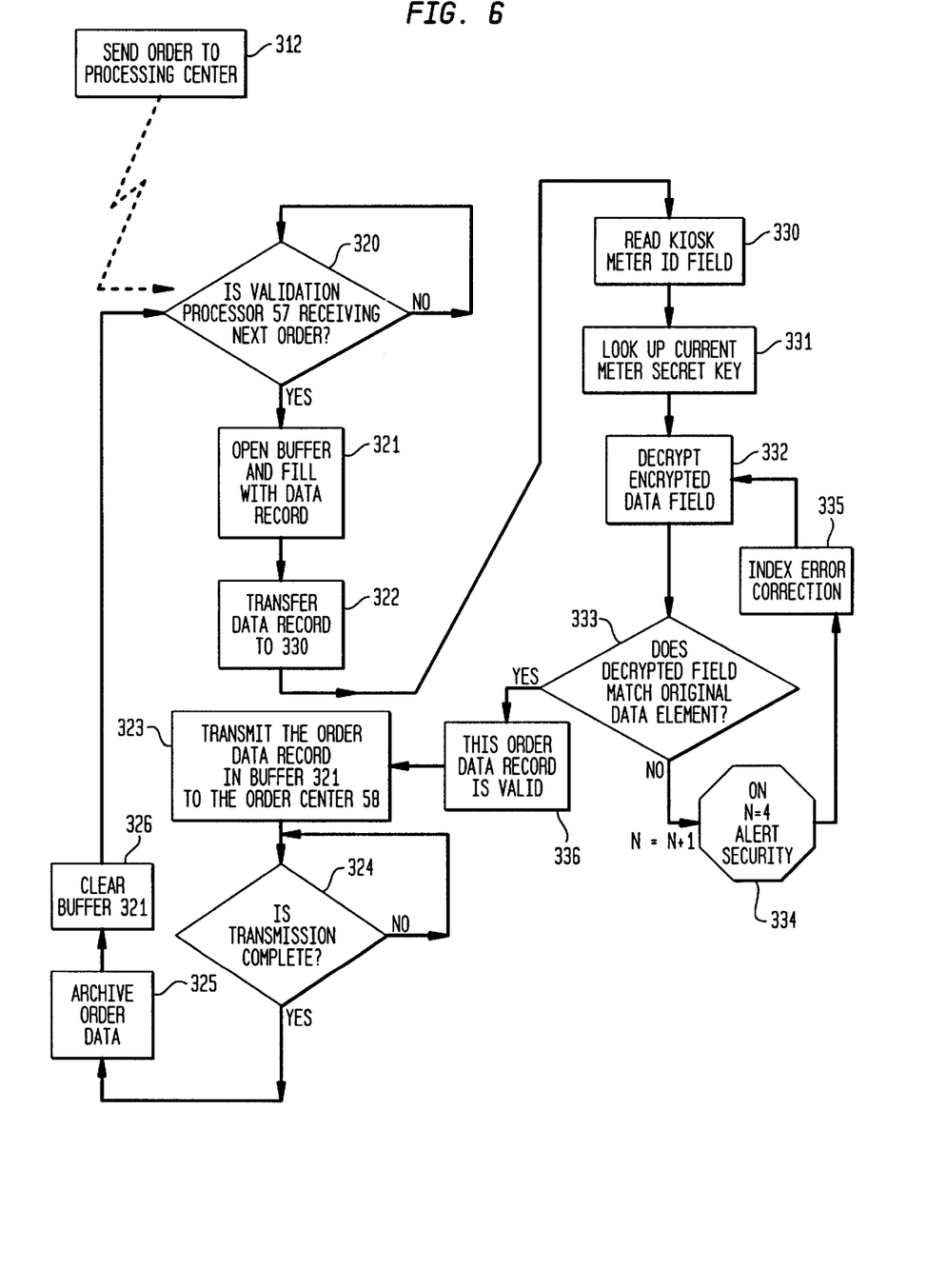

FIGS. 4–6 is a flow chart showing the program contained in fulfillment process controller 49 of FIG. 3. The program begins in decision block 120 (FIG. 4). In block 120 the program determines whether or not kiosk process controller 42 (FIG. 3) is requesting the offering of goods and services. If, controller 42 is not requesting goods and services, the program returns to start. If, goods and services have been requested by controller 42, then the program proceeds to block 121 to offer the goods and services stored in database 52 (FIG.3). After the goods and services have been offered the program precedes to decision block 124. Block 124 determines whether or not the last item of goods and/or services has been selected. If, the last item of goods and/or services has not been selected the program goes to decision block 125. In block 125 the program determines whether or not the user has finished selecting goods and/or services. If, block 125 determines that the user has finished selecting goods and/or services then, the program proceeds back to block 120 to determine whether or not kiosk process controller 42 (FIG. 3) is requesting the offering of goods and services. If, block 125 determines that the user has not finished selecting goods and/or services then, the program proceeds back to block 124 to determine whether or not the last item of goods and/or services has been selected. If, the last item of goods and/or services has been selected the program goes to decision block 126. Block 126 determines whether or not the user has finished making his choices of goods and/or services. If, the user has not finished making his choices of goods and/or services the program goes back to block 124. If, the user has finished making his choices of goods and/or services the program goes to block 127 to request kiosk process controller 42 (FIG. 3) transfer order information recipient name and address and sender ID and payment data to block 200. At this point the program precedes to decision block 128. Decision block 128 determines whether or not the aforementioned transfer was accomplished. If, the aforementioned transfer was not accomplished the program goes back to block 127. If, the aforementioned transfer was accomplished the program goes back to block 120.

The program will go to decision block 200, when block 200 receives data from block 127. Decision block 200 determines whether or not a composed order was requested. If, a composed order was not requested, then the program goes back to the input of block 200. If, a composed order was requested, then the program goes to block 202 to open compose order field buffers. Then the program goes to block 203 to compose recipient name and address fields. Now the program goes to block 204 to compose the sender name and address fields. At this point the program goes to block 205 to compose the sender account/approval fields. Now the program goes to block 206 to compose and buffer fixed format data (kiosk ID, date and time fields. Then the program goes to block 207 to open a direct link to the encryptor portion of postage meter 41 (FIG. 3). At this juncture the program goes to block 208 to extract and send the recipient zip code field to meter 41. Then the program goes to block 209 to extract and send total payment value field to meter 41. At this juncture the program proceeds to block 210 to compose and send the date and time fields to meter 41. Now, the program proceeds to decision block 211. In decision block 211 the program determines whether or not to accept the encrypted data field and buffer from meter 41. If, block 211 determines not to accept the encrypted data field and buffer then and in that event the program goes back to the input of block 211. If, block 211 determines to accept the encrypted data field and buffer then the program goes to block 212. In block 212 the program proceeds to decision block 300 (FIG. 5).

Decision block 300 determines whether or not printer 47 (FIG. 3) is going to print the next receipt 20 (FIG. 2). If, printer 47 is not going to print the next receipt 20 then the program goes back to the input of block 300. If, printer 47 is going to print the next receipt 20 then the program goes to block 301 to compose the receipt 20 print image. Now the program goes to block 302 to send the print image to receipt printer 47. Then the program goes to decision block 303. Block 303 determines whether or not receipt 20 was printed. If, block 303 determines that receipt 20 was not printed then the program goes back to the input of block 303. If, block 303 determines that receipt 20 was printed then the program goes to block 304.

At this point the program goes back to block 300 and if information was transmitted to block 310 then, the program goes to block 310. Decision block 310 determines whether or not to transmit the next order to process funds data center 55 (FIG. 3). If, block 310 determines not to transmit the next order then the program goes back to the input of block 310. If, block 310 determines to transmit the next order then the program goes to block 311 to compose the current order data fields. Now the program goes to block 312 to send the order to processor 57. At this point the program will go to block 320 (FIG. 6) as well as the input of decision block 313. Block 313 determines whether or not a order was received at processor 57. If, a order was not received at processor 57 then the program goes back to the input of block 313. If, a order was received at processor 57 then the program goes to block 314 to archive order data. Now the program goes to block 315 to clear buffers before preceding back to the input of block 310.

Decision block 320 (FIG. 6) determines whether or not order validation processor 57 (FIG. 3) is receiving the next order. If, processor 57 did not receive the next order the program goes back to the input of block 320. If, processor 57 is receiving the next order the program goes to block 321 to open a buffer and fill with a data record. Then the program goes to block 322 to transfer the data record to block 330. Block 330 reads postage meter 41 ID field serial number 16. Then the program goes to block 331 to look up the current postage meter 41 secret key that is stored in processor 56. Now the program goes to block 332 to decrypt the encrypted data field contained in coded message 35. At this point the program precedes to decision block 333. Block 333 determines whether or not the decrypted field matches the original data elements. In other words does coded message 35 match the information contained in block 127. Then the program goes to block 334 on N=4 alert security and block 335 index error correction by 1. Now the program goes back to block 332. If, the program passes through block 333 four times determining that coded message 35 does not match the information contained in block 127, then the program will go to block 334 and alert security. If, decision block 333 determines that coded message 35 does match the information contained in block 127, then the program will go to block 336 this order data record is valid.

At this point the program goes to block 323 to transmit the order data record in buffer 321 to order processing center 58. Then the program goes to decision block 324. Block 324 determines whether or not the transmission is completed. If, the transmission is not completed then the program goes back to the input of block 324. If, the transmission is completed the program goes to block 325 to archive the order data in the data base of processor 57. Then program clears buffers in block 326 before preceding back to the input of block 320.

FIG. 7 is a flow chart showing how customer service applications is supported by VRU 65 over touch tone telephone 400. A customer service operator at customer service 59 uses the keys on telephone 400 to enter the information contained in coded message 35, the total cost 34, the authorization code 26, the date 21, the time 22 and the postal meter serial number 16. It would be obvious to one skilled in the art that additional or different information may be entered via telephone 400. Telephone 400 is coupled to data set 401. The operation of data set 401 is more fully described in Eckert's U.S. Pat. No. 4,097,923 entitled "Remote Postage Meter Charging System Using An Advanced Microcomputerized Postage Meter", herein incorporated by reference. Data set 401 is coupled to data buffer 402. Data set 401 and data buffer 402 are contained in order validation processor 57.

The program begins in decision block 403. Block 403 determines whether or not data buffer 402 is full. If, data buffer 402 is not full then the program goes back to the input of block 403. If, data buffer 402 is full then the program goes to block 404 to read the kiosk meter 41 ID field in data buffer 402. Then the program precedes to block 405 to look up the current meter 41 secret key. Then the program goes to block 406 to decrypt the encrypted data field of coded message 35 in data buffer 402. Now the program goes to block 407. Decision block 407 determines whether or not the decrypted field matches the original data elements. If, the decrypted field does not match the original data elements, then the program goes to block 408 on N=4 alert security. Then, the program goes to block 409 to activate the error correction process. If, the program passes through blocks 406 and 407 four times and the decrypted field does not match the original data elements on each try, then the program will go to block 408 and alert security. The program will also go to block 411 in VRU 65 and say this order record is not valid. The foregoing message will be transmitted to data set 401 and telephone 400. If, the decrypted field does match the original data elements in block 407, then the program goes to block 410 in VRU 65 to say this order data record is valid. The foregoing message is transmitted to telephone 400 via data set 401.

The above specification describes a new and improved kiosk that provides verifiable receipts for commercial transactions. The kiosk contains a postage meter. The imbedded digital metering cryptographic technology that is contained in the postage meter may be used to produce a verifiable receipt. It is realized that the above description may indicate to those skilled in the art additional ways in which the principles of this invention may be used without departing from the spirit. It is, therefore, intended that this invention be limited only by the scope of the appended claims.

What is claimed is:

1. A system for ordering goods and/or services and printing verifiable, customer receipts, which receipts are not postage indicia, for the goods and/or services ordered, said system comprising:

means for ordering the goods and/or services;

means coupled to said ordering means for paying for the ordered goods and/or services;

means for determining the destination of delivery of the ordered goods and/or services;

means for determining the name and address of a sender of the ordered goods and/or services;

means coupled to said destination determining means, said ordering means and said name and address determining means for printing a verifiable customer receipt that comprises a cryptographic number, which cryptographic number is calculated based on and is unique to the destination of delivery of the goods and/or services, the cost of goods and/or services ordered, and the name and address of the sender of the goods and/or services; and means coupled to said cryptographic printing means for delivering the goods and/or services.

2. The system claimed in claim 1, further including:

means coupled to said cryptographic means for verifying the cryptographic number printed by said cryptographic printing means.

3. The system claimed in claim 2, wherein said verifying means comprises:

means for reading the cryptographic number;

means coupled to said reading means for decrypting the cryptographic number; and means for comparing the decrypted number with the information contained in the destination of delivery of the goods and/or services.

4. The system claimed in claim 1, wherein the cryptographic means comprises:

a postage meter that responds to the destination of delivery of the goods and/or services and prints said cryptographic number.

5. The system claimed in claim 4, wherein said postage meter is coupled to said ordering means and said postage meter utilizes the cost of the goods and/or services in printing said cryptographic number.

6. The system claimed in claim 5, wherein said postage meter utilizes a credit card authorization code to produce a cryptographic code.

7. The system claimed in claim 4, wherein said postage meter utilizes the date and the time the goods and/or services were ordered to print said cryptographic number.

8. The system claimed in claim 4, wherein said postage meter utilizes the postage meter serial number to print said cryptographic number.

9. The system claimed in claim 4, wherein said postage meter franks mail.

10. The system claimed in claim 1, wherein said cryptographic printing means is coupled to said ordering means so that said cryptographic means uses the date and time the order was placed by said ordering means to calculate and print said cryptographic number.

11. The system claimed in claim 1, wherein the cryptographic printing means comprise:

a postage meter that uses the senders name and address to print said cryptographic number.

12. The system claimed in claim 1, wherein the cryptographic means comprise:

a postage meter that uses the cost of ordered goods and/or services to generate said cryptographic number and prints said generated number.

* * * * *